July 13, 1965     N. V. SMITH     3,194,354
SPEED CONTROL MECHANISM
Filed Oct. 15, 1963
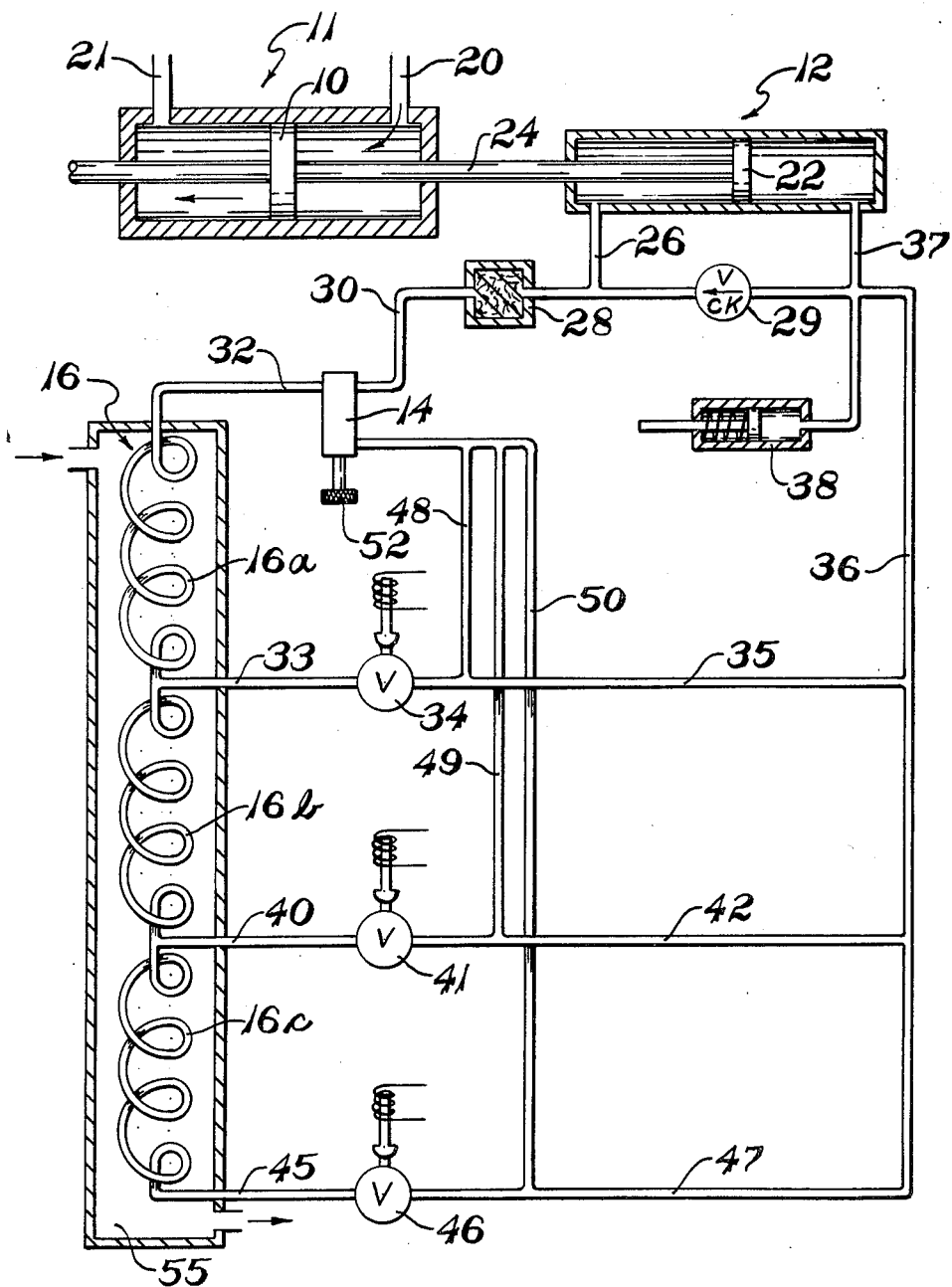
INVENTOR.
NEIL V. SMITH
BY John D. Haney
ATTY.

United States Patent Office 3,194,354
Patented July 13, 1965

3,194,354
SPEED CONTROL MECHANISM
Neil V. Smith, La Canada, Calif., assignor to International Basic Economy Corporation, New York, N.Y., a corporation of New York
Filed Oct. 15, 1963, Ser. No. 316,317
7 Claims. (Cl. 188—97)

This invention relates to mechanism for controlling the operating speed of an impositively driven member such as a piston of a fluid-actuated piston motor. The invention has special utility for controlling fluid-actuated motors, either of the linear or the rotary movable type, for feeding tools or moving other components of complex machinery, scientific apparatus and the like.

A particular characteristic of the control mechanism of this invention is that it provides for unusually slow feed rates with remarkable accuracy for indefinite periods, as compared with the most efficient control apparatus known in the art prior to this invention. For example, feed rates of less than .0088 inch per minute have been maintained by this mechanism for indefinite periods with a maximum deviation of plus or minus .0003 inch per minute. Although feed rates of this magnitude are not ordinarily required in industrial operations, they are necessary in laboratory apparatus and certain other high precision machinery.

The basic elements of the control mechanism of this invention include a means, associated with the movable member on which the control is exerted, for displacing a fluid medium at a flow rate commensurate with the operating speed of the movable member. The displaced fluid medium is communicated to the inlet end of a special fluid filled tube through which the fluid medium passes to the outlet end of the tube. The internal diameter and length of the tube is selected so that the tube provides significant flow resistance to the fluid displaced to it. Accordingly, the tube acts to retard or oppose the movement of the control member.

The size of the opening through the tube is further selected so that the particular fluid medium flows through the tube in a laminar state. Under these conditions, with a tube of given length, the velocity of the fluid in the tube (and therefore the flow rate through the tube) is a direct linear function of the pressure difference between the inlet and the outlet of the tube. The mechanism further includes a combination pressure reducing-regulating valve at the inlet of the tube to regulate the pressure difference between the inlet and the outlet. Accordingly, the velocity (and hence the flow rate) of the fluid medium flowing through the tube can be accurately adjusted by adjusting the pressure regulator valve. That is to say, by adjusting or varying the pressure difference across the tube ends by means of the pressure regulator valve, the flow resistance of the tube can be very finely regulated with a corresponding regulation imposed on the movable member under control.

The tube component is preferably metal tubing with a very small internal diameter—e.g. preferably less than .050 inch in diameter. Such tubing is frequently referred to in the art as "capillary" tubing. Moreover, the tubing is preferably shaped in helical coils.

Optionally, the tubing may be immersed in a water bath or other suitable heat exchanger to maintain isothermal conditions for the fluid.

Ordinarily the fluid medium selected for use in the control apparatus is hydraulic oil but the apparatus will operate satisfactorily with air or other suitable gases as the fluid medium. The principles of operation are the same with liquid or gas as the fluid medium.

The invention will be further described with reference to the accompanying drawing which shows, by way of example, and also in semi-diagrammatic form, one system with which a control apparatus of this invention may be associated.

Referring to the drawing, a piston 10 of a pneumatic piston-cylinder motor 11 is associated with a control apparatus, the principal elements of which are a hydraulic cylinder motor 12, a manually adjustable pressure regulator and reducing valve 14 and a flow resistance tube 16. The control apparatus functions to regulate the linear speed of the pneumatically operated piston 10 in its cylinder 11. All components, it will be recognized, are shown schematically, in the drawing for clarity. The details of the seals, packings, etc. have been deliberately omitted from the piston motors. The structure of the valves shown will be evident to those skilled in the art from the description of their functions herein.

The piston 10 in the condition shown in the drawing is being urged leftward (see the arrow) by air pressure supplied to cylinder 11 through port 20. Port 21 exhausts the region in front of piston 10. The resulting movement of piston 10 is transmitted mechanically to the hydraulic piston 22 of cylinder 12 by a rigid interconnecting rod 24. Therefore, the piston 22 and the piston 10 will move at the same speed.

The region of the cylinder 12 in front of piston 22 is filled with a suitable hydraulic oil. Additionally, all of the pipes hereinafter described and the flow resistance or control tube 16 are similarly filled with such oil.

In response to the leftward movement of piston 10, piston 22 displaces oil from the left region of cylinder 12 through pipe 26 and then through a filter 28. A check valve 29 blocks flow of this displaced fluid toward the right end of cylinder 12.

Beyond the filter 28, displaced fluid passes via pipe 30 to the inlet port of pressure regulator-reducer valve 14. The fluid exits from valve 14 to an inlet portion 32 of the resistance tube 16.

The resistance tube 16 shown in the drawing includes three stages of coils 16a, 16b and 16c. These stages are connected one to another in series. At the junction between coil 16a and 16b a pipe 33 is capable of conducting the fluid displaced through the branch 16a of the tube to a two-way solenoid valve 34. When the valve 34 is open the fluid exits the valve through pipe 35 and can pass via pipe 36 to re-enter cylinder 12 through pipe 37. An accumulator 38 is connected to pipe 37 to provide a reserve of fluid for the system.

As previously stated, the coil branch 16a is in direct communication with a second coil branch 16b and the latter is in direct communication with coil 16c of the resistance tube 16. At the junction of coil 16b and 16c fluid can flow rightward through pipe 40 and can proceed through a solenoid valve 41 and via pipe 42 to return pipes 36, 37.

The lower end of coil 16c of the resistance tube 16 is similarly connected to a pipe 45 through which fluid can pass via solenoid valve 46 to pipe 47 communicating with the return pipes 36, 37.

The purpose of the valves 34, 41 and 46 is to provide for adjusting the effective length of the resistance tube 16. If the operating conditions are such that the entire length of tube 16 is used, then the three coiled branches of the tube act as a single tube, the outlet of which is pipe 45. Under these operating conditions, valve 46 will be open but valves 34 and 41 will be closed. On the other hand, if it is desired to use a shorter length of the resistance coil 16 then only coil branch 16a is used, the outlet end of the resistance tubing being in this case pipe 33. Also under these circumstances valve 34 will be open whereas valves 41 and 46 will be closed.

It is to be noted that adjoining the outlet side of valve 34 there is a pipe 48 which communicates fluid pressure from pipe 35 to the pressure reducing valve 14. Similarly, a pipe 49 communicates the fluid pressure in pipe 42 and a pipe 50 communicates fluid pressure of pipe 47 to the pressure reducing valve. The purpose of the latter pipes is to insure that accurate pressure difference is maintained between the inlet end 32 of the resistance tube 16 and the potentially available outlet ends depending on how much of the total length of resistance tube 16 is being used in a given operation.

The pressure reducing-regulating valve 14 is preferably a diaphragm operated valve which is provided with a manual adjustment 52 to vary the setting of the valve. The pipes 48, 49, 50 leading respectively from the outlet ends of the coiled branches of resistance tube 16 are connected into the pressure regulator-reducer valve in a manner to assist the spring force used in the pressure regulator valve to maintain the regulation function.

The flow resistance tube 16 is preferably a capillary tube, the internal diameter of which will ordinarily be less than .050 inch. Tubing having an internal diameter of .020 inch has been used in a system of the type illustrated and has provided feed rates in the order of those discussed in the foregoing. The tubing is preferably high grade smooth metal tubing and is preferably helically coiled as suggested in the drawing.

In the apparatus illustrated, the resistance tube 16 is immerse in a water bath 55, the temperature of which is such that the hydraulic oil flowing through the tube is maintained at uniform temperature. The use of a heat exchanger such as water bath 55 is an optional feature and ordinarily it is not necessary except under conditions when the fluid absorbs considerable heat from the surroundings in which the mechanism is operating. The resistance of the tube 16 to the flow of fluid through it normally does not appreciably increase the temperature of the oil.

As discussed in the foregoing, the diameter or cross section area of the flow resistance tube 16 is selected on the basis that the flow of the particular fluid used in the mechanism at the maximum expected velocities will remain laminar. That is to say, the tubing is designed so that the Reynolds number of the flow does not exceed about 2000.

Under these conditions, for any given length of the tube 16, the pressure difference between the inlet and the outlet of the resistance tube is a direct linear function of the velocity or flow rate of the fluid through the tubing. The pressure difference may be accurately regulated and conveniently adjusted by the valve 14 to provide for accurate speed regulation.

In the operation of the system shown, as the driven piston 10 is moved leftward, piston 22 moves leftward with it at the same speed displacing a quantity of the hydraulic fluid in front of piston 12 through the filter 28 and through the pressure reducing-regulating valve 14 to the inlet 32 of the resistance tube 16. Assuming that the entire length of the flow resistance tube 16 is to be used in the operation, then valves 34 and 41 will be closed whereas valve 46 will be opened. The pipe 50 communicates the pressure of the fluid at the outlet end 45 of the flow resistance tube 16 back to the pressure regulator valve 14 so that the pressure regulator valve functions to maintain accurately the desired pressure difference. The manual adjustment 52 of valve 14 will be initially set to provide a selected pressure difference between the inlet 32 and the outlet 45 of tube 16. This is automatically controlled thereafter by valve 14. The flow resistance provided by the tube 16 to the fluid displaced to it from cylinder 12 thereby acts to retard the leftward movement of piston 22 and accordingly permits movement of piston 22 in a manner commenurate only with the flow rate of the fluid through the resistance tubing 16. The main working piston 10 is similarly retarded through its mechanical connection with the piston 22.

The operation is essentially the same if only one or more of the coiled branches of the resistance tubing 16 is used, except that the appropriate solenoid valves will be opened or closed as conditions warrant.

Although the invention has been illustrated in connection with the control of the pneumatically actuated piston 10 the principles of the invention apply to any impositive driven member. By "impositive" we refer to a form of mechanical drive in which the impelling force acts continuously on the driven member but does not necessarily produce a movement of the driven member commensurate with the magnitude of the driving force. Examples of such "impositive" drives include friction belt driven members, mechanical parts driven by slipping friction clutches, gravity displaceable parts, rotary fluid actuators and the like. In adapting this control mechanism to such drives, a fluid chamber is established corresponding to the function of cylinder 12 and a movable member corresponding to piston 12 will be connected with the driven member under control.

In a fluid system of the type illustrated, the restrained fluid may be a part of an open system. That is, the fluid may be delivered from the outlet of tube 16 to a sump or reservoir at atmospheric pressure.

Although the separate coiled branches of the tube 16 in the illustrated system are shown in series, variations of the control apparatus are possible by connecting the branches of tube 16 in parallel or in various series-parallel networks.

Other variants are within the scope of the appended claims.

I claim:

1. A speed control mechanism for an impositively driven member, said mechanism comprising:
   (1) a fluid flow resistance tube having a preselected length and having an inlet and an outlet for the passage of a fluid-medium through the tube,
      (a) the size of the opening through said tube being selected such that the flow of the particular fluid communicated thereto remains laminar throughout the length of the tube,
   (2) means for displacing a fluid medium to the inlet of and through said tube to said outlet in response to the movement of a driven member with which the control mechanism is associated, and
   (3) means for adjustably regulating and thereafter maintaining constant the pressure difference between the fluid at said inlet and the fluid at said outlet to control the flow rate of the fluid through said tube.

2. A speed control mechanism as defined in claim 1 wherein said resistance tube is a metal capillary tube having an internal diameter of less than .050 inch.

3. A speed control mechanism as defined in claim 1 wherein said means for displacing a fluid medium to said inlet of said resistance tube includes:
   (a) a chamber for containing said fluid medium,
   (b) means for communicating said fluid medium to the inlet of said resistance tube,
   (c) a member movable in said chamber, and
   (d) means for connecting said movable member with the driven member with which said control is associated whereby said movable member moves in response to and commensurate with said driven member.

4. A speed control mechanism as defined in claim 1 wherein
   (a) a pressure reducing-regulating valve regulates the pressure of said displaced fluid as it enters said inlet of said flow resistance tube.

5. A speed control mechanism as defined in claim 4 wherein the pressure of said fluid medium at said outlet is communicated to said pressure reducing-regulating valve to provide for an accurate differential pressure between said inlet and said outlet.

6. A speed control mechanism as defined in claim 4 wherein said pressure reducing-regulator valve is manually adjustable to vary the pressure differential between said inlet and said outlet and thereby correspondingly adjust the flow rate of fluid through said resistance tube.

7. Mechanism as defined in claim 1 and further including means for regulating the temperature of the fluid medium in said resistance tube.

References Cited by the Examiner

UNITED STATES PATENTS

| | | | |
|---|---|---|---|
| 1,457,328 | 6/23 | Van Berkel | 188—97 |
| 1,829,340 | 10/31 | Coutin | 188—100 |
| 2,134,542 | 10/38 | Alsing | 138—42 X |
| 2,620,823 | 12/52 | Adams et al. | 188—97 X |
| 2,731,039 | 1/56 | Barrett et al. | 138—45 |
| 2,878,873 | 3/59 | Novak | 188—97 |
| 2,898,103 | 8/59 | Boulet | 267—65 |
| 2,956,583 | 10/60 | Streeter | 138—46 |
| 2,956,647 | 10/60 | Barthalomaus | 188—100 |
| 3,033,323 | 5/62 | Manna | 188—97 |
| 3,060,312 | 10/62 | Jackson | 188—97 X |
| 3,106,993 | 10/63 | May | 188—96 X |

EUGENE G. BOTZ, *Primary Examiner.*